United States Patent
Ishibashi

(10) Patent No.: US 11,790,600 B2
(45) Date of Patent: Oct. 17, 2023

(54) IMAGE PROCESSING DEVICE, IMAGING APPARATUS, IMAGE PROCESSING METHOD, AND RECORDING MEDIUM

(71) Applicant: CANON KABUSHIKI KAISHA, Tokyo (JP)

(72) Inventor: Takuya Ishibashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/830,475

(22) Filed: Jun. 2, 2022

(65) Prior Publication Data
US 2022/0392155 A1 Dec. 8, 2022

(30) Foreign Application Priority Data
Jun. 4, 2021 (JP) ................. 2021-094028

(51) Int. Cl.
*G06T 15/60* (2006.01)
*G06T 7/593* (2017.01)
*G06T 15/50* (2011.01)
*G06T 7/571* (2017.01)

(52) U.S. Cl.
CPC ............ *G06T 15/60* (2013.01); *G06T 7/571* (2017.01); *G06T 7/593* (2017.01); *G06T 15/506* (2013.01)

(58) Field of Classification Search
CPC ............... G06T 15/506; G06T 15/60; G06T 2207/10012; G06T 7/571; G06T 7/593; G06T 7/73
See application file for complete search history.

(56) References Cited

U.S. PATENT DOCUMENTS

| | | | |
|---|---|---|---|
| 10,380,743 B2 * | 8/2019 | Miyazato | G06V 10/44 |
| 10,573,067 B1 * | 2/2020 | Naik | G06T 7/73 |
| 10,914,960 B2 * | 2/2021 | Moriuchi | G02B 5/201 |
| 2019/0034765 A1 * | 1/2019 | Kaehler | G06F 18/2148 |

FOREIGN PATENT DOCUMENTS

JP 2020-010168 A 1/2020

* cited by examiner

*Primary Examiner* — Ming Wu
(74) *Attorney, Agent, or Firm* — Venable LLP

(57) ABSTRACT

An image processing device includes a shape acquisition unit configured to acquire shape information of a subject, a first region detection unit configured to detect a first region generating a shadow of the subject, a second region detection unit configured to detect a second region onto which the shadow is projected, a virtual light source direction setting unit configured to determine a direction of a virtual light source in which the first region projects the shadow onto the second region on the basis of the shape information, the first region, and the second region, and an image generation unit configured to generate an image with the shadow on the basis of the shape information and the determined direction of the virtual light source.

18 Claims, 12 Drawing Sheets

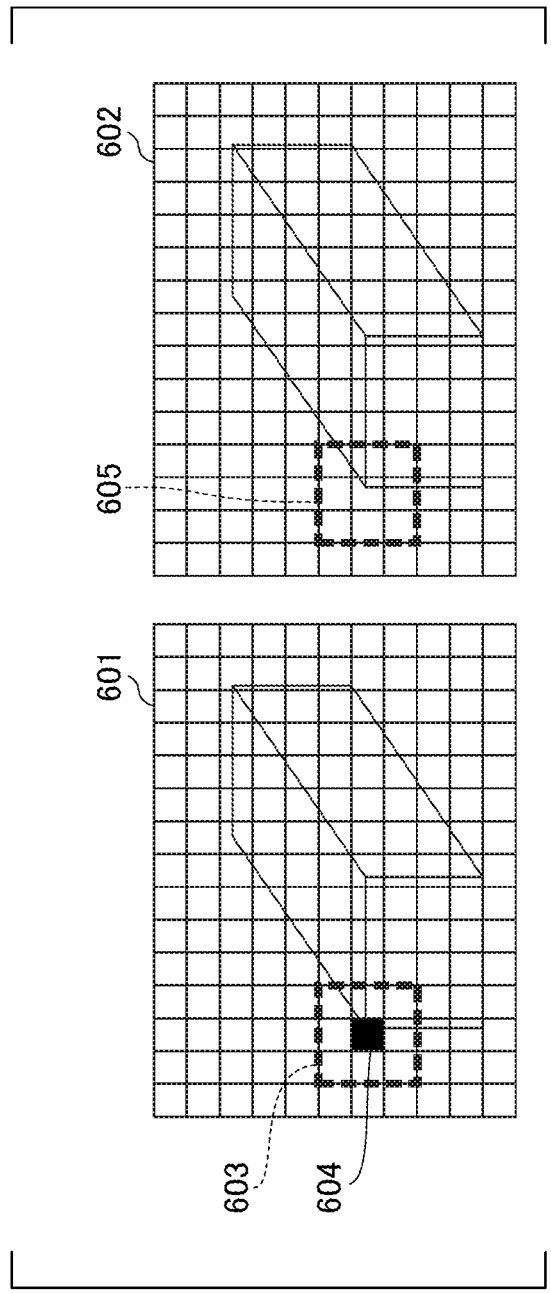
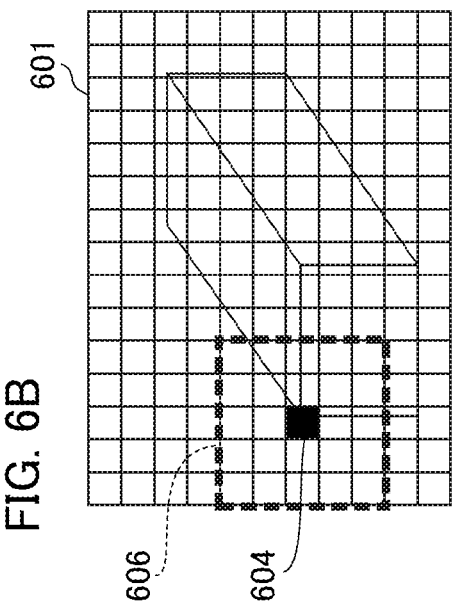
FIG. 6A
FIG. 6B (A)

IMAGE PROCESSING DEVICE, IMAGING APPARATUS, IMAGE PROCESSING METHOD, AND RECORDING MEDIUM

BACKGROUND OF THE INVENTION

Field of the Invention

The present invention relates to an image processing device, an imaging apparatus, an image processing method, and a recording medium.

There is image processing called a rewriting process (shadowing process) of generating a shaded image with shadows added through image processing. In the rewriting process, for example, a virtual light source is set, a shadow region produced by the virtual light source is calculated by using a direction of the set virtual light source and shape information of a subject, and a shaded image is generated by adding a shadow to the calculated region. Japanese Patent Laid-Open No. 2020-10168 discloses a technique of setting a position of a virtual light source on the basis of a positional relationship between a person and a shield such that an unnecessary shadow is not added on a face of the person through a rewriting process in a case where there is a shield between the set virtual light source and the face of the person.

In Japanese Patent Laid-Open No. 2020-10168, it is possible to prevent a person's face from being shaded by a shield, but there is concern that an appropriate shadow desired by a user may not be able to be produced according to the technique. In order to produce an appropriate shadow in the rewriting process, it is required to automatically determine an appropriate direction of the virtual light source.

SUMMARY OF THE INVENTION

The present invention provides an imaging apparatus capable of setting a direction of the virtual light source in which a main subject can produce an appropriate shadow on another subject.

According to the present invention, there is provided an image processing device including at least one processor and/or circuit configured to function as a shape acquisition unit configured to acquire shape information of a subject; a first region detection unit configured to detect a first region generating a shadow of the subject; a second region detection unit configured to detect a second region onto which the shadow is projected; a direction setting unit configured to set a direction of a virtual light source in which the first region projects the shadow onto the second region on the basis of the shape information, the first region, and the second region; and an image generation unit configured to generate an image with the shadow on the basis of the shape information and the set direction of the virtual light source.

Further features of the present invention will become apparent from the following description of exemplary embodiments with reference to the attached drawings.

BRIEF DESCRIPTION OF THE DRAWINGS

FIGS. 6A and 6B are diagrams for describing a minute block.

DESCRIPTION OF THE EMBODIMENTS

First Embodiment

Figure 1:
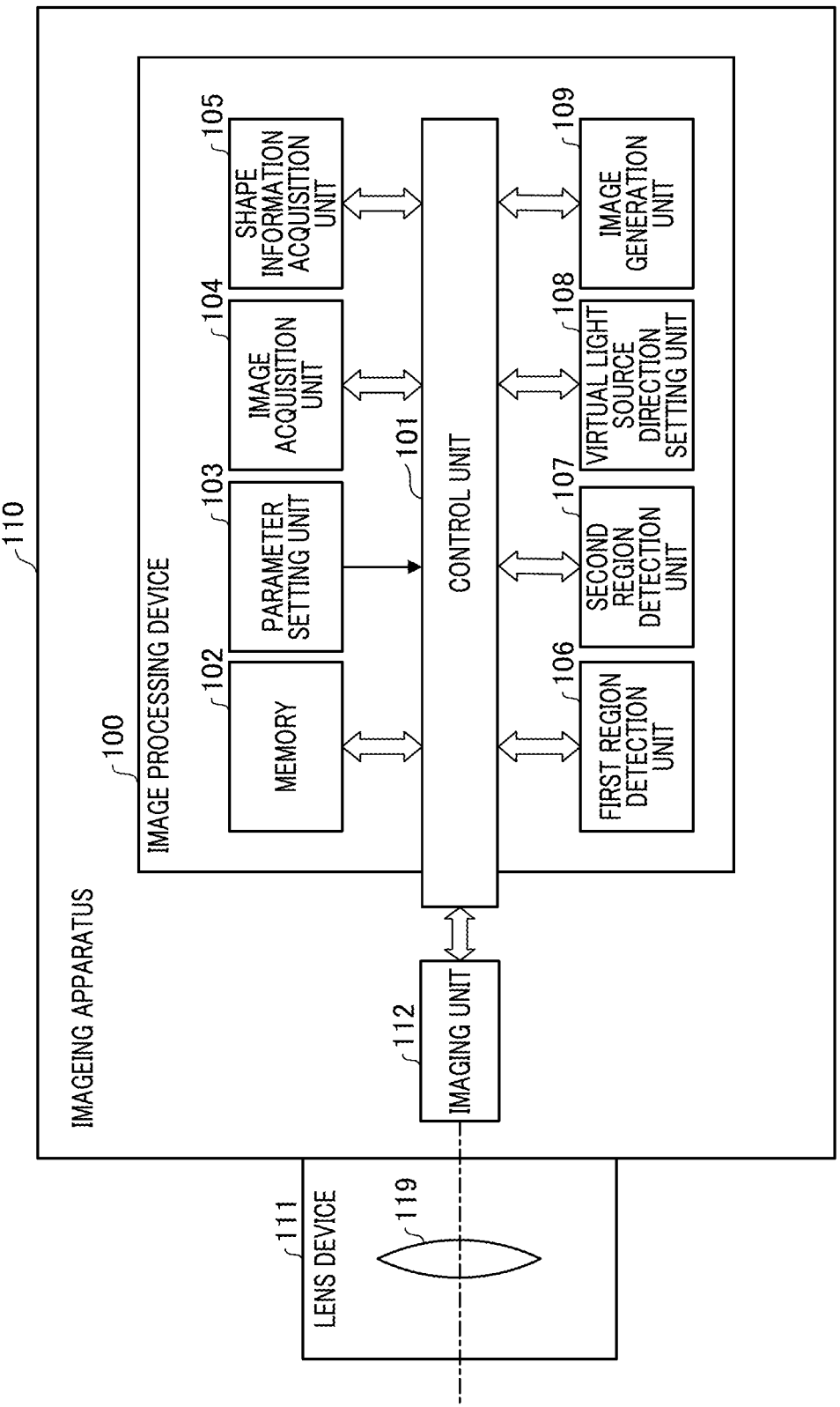
FIG. 1 is a diagram for describing a configuration of the entire imaging apparatus.

FIG. 1 is a diagram for describing a configuration of the entire imaging apparatus. An imaging apparatus 110 includes an image processing device 100 and an imaging unit 112. A lens device 111 is detachably connected to the imaging apparatus 110. The image processing device 100 of the present embodiment executes a rewriting process of generating a shaded image with a shadow as image processing on an acquired image. The image processing device 100 includes a control unit 101, a memory 102, a parameter setting unit 103, an image acquisition unit 104, a shape information acquisition unit 105, a first region detection unit 106, a second region detection unit 107, a virtual light source direction setting unit 108, and an image generation unit 109.

The lens device 111 includes an imaging optical system. The imaging optical system includes a plurality of lenses 119 such as a zoom lens and a focus lens, a diaphragm, and a shutter, and forms an optical image of a subject on an imaging element. The imaging unit 112 images a subject. The subject is a target on which the image processing device 100 performs image processing. The imaging unit 112 is an imaging element having a photoelectric conversion element such as a CMOS or a CCD, and outputs an output signal (analog signal) corresponding to an optical image. In the present embodiment, an example in which the lens device 111 is detachably connected to the imaging apparatus 110 will be described, but the imaging apparatus 110 and the lens device 111 may be integrated.

The control unit 101 controls an operation of the entire imaging apparatus 110 including the image processing device 100. The control unit 101 includes, for example, a central processing unit (CPU). The CPU executes a program stored in a non-volatile memory such as a read only memory (ROM), and thus the functions of the imaging apparatus 110 or various processes that will be described later are realized.

An image (hereinafter, also referred to as image information) output by the imaging unit 112 is supplied to the image acquisition unit 104. The image acquisition unit 104 acquires an image captured by the imaging unit 112 or an image captured by an apparatus other than the imaging apparatus 110, and stores the image in the memory 102. The memory 102 stores an image. The memory 102 reads information necessary for processing in each module and stores a processing result in each module. The parameter setting unit 103 receives a setting of each parameter related to imaging, image processing, and the like from a user, and stores each piece of parameter information input by the user in the memory 102. The parameter setting unit 103 also receives designation of an approximate direction of the virtual light source designated by the user, which will be described later, from the user.

The shape information acquisition unit 105 is a shape acquisition unit configured to calculate and acquire shape information from an image captured by the imaging unit 112. The shape information acquisition unit 105 acquires the calculated shape information or shape information input to the image processing device 100 by the user. The shape information acquisition unit 105 stores the acquired shape information in the memory 102.

The first region detection unit 106 detects a first region from at least one of image information, shape information, and second region information. In the present embodiment, the first region is a subject that produces a shadow through the rewriting process, that is, a region that produces a shadow by the rewriting process. The first region detection unit 106 stores information regarding the detected first region in the memory 102. The second region detection unit 107 detects a second region from at least one of the image information, the shape information, and the first region information. In the present embodiment, the second region is a region where a shadow of the first region is projected (added) through the rewriting process. The second region detection unit 107 stores information regarding the detected second region in the memory 102.

The virtual light source direction setting unit 108 sets a direction of the virtual light source when the rewriting process is performed on the basis of the first region, the second region, and the shape information. The virtual light source direction setting unit 108 stores information regarding the set direction of the virtual light source in the memory 102. The image generation unit 109 generates a shaded image in which a shadow calculated on the basis of the direction of the virtual light source and the shape information is added to an image. The image generation unit 109 stores the generated shaded image in the memory 102. As described above, in the present embodiment, a region of a subject (first region) where a virtual light source produces a shadow is calculated, and a shaded image is generated by adding a shadow to a calculated region (second region) such as a floor surface.

Figure 2A:
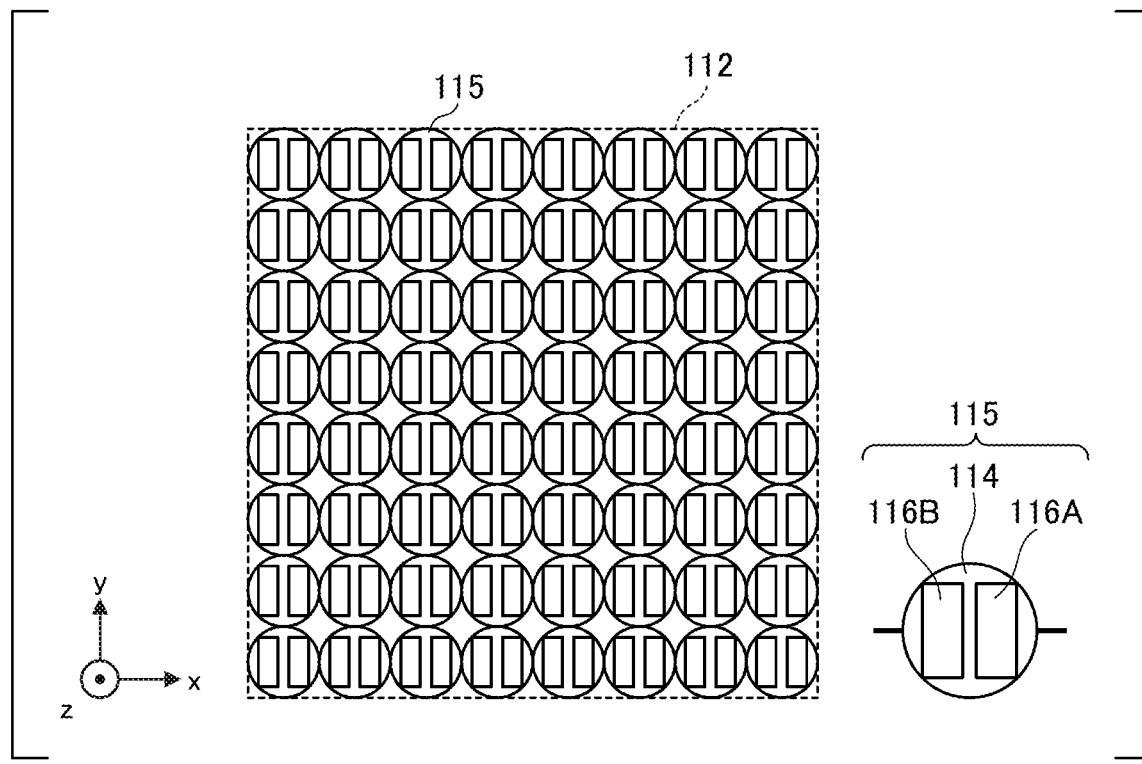
FIGS. 2A and 2B are diagrams for describing an imaging unit and an imaging optical system.
Figure 2B:
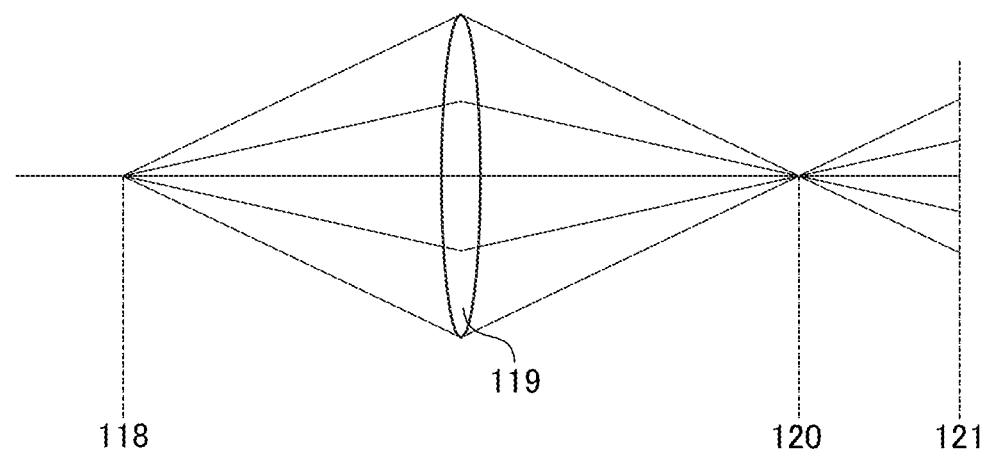

FIGS. 2A and 2B are diagrams for describing the imaging unit 112 and the imaging optical system. FIG. 2A is a diagram showing a configuration of an imaging element that is the imaging unit 112. Pixels 115 are two-dimensionally and regularly arranged in the imaging element. One pixel 115 has one microlens 114 and a pair of photoelectric conversion portions (a photoelectric conversion portion 116A and a photoelectric conversion portion 116B). The pair of photoelectric conversion portions receive light fluxes passing through different pupil regions of the imaging optical system via one microlens 114. A plurality of viewpoint images (a pair of viewpoint images) are generated from the light flux received by each photoelectric conversion portion. Hereinafter, the viewpoint image captured by the photoelectric conversion portion 116A will be referred to as an A image, and the viewpoint image captured by the photoelectric conversion portion 116B will be referred to as a B image. An image obtained by combining the A image and the B image will be referred to as an A+B image. Since each pixel of the imaging unit 112 has a pair of photoelectric conversion portions, it is possible to acquire a pair of pieces of image data (A image, B image) on the basis of the light flux passing through different pupil regions of the imaging optical system. On the basis of the parallax of the A image and the B image, distance information between a subject and the imaging apparatus 110 can be calculated by using parameters such as a conversion coefficient determined by a size of an opening angle of the center of gravity of light fluxes passing through a pair of distance measurement pupils.

FIG. 2B is a diagram showing a configuration of an imaging optical system included in the lens device 111. The imaging unit 112 forms an image of light emitted from an object 118 on an image plane 120 with the lens 119, and receives the light on a sensor surface 121 of the imaging element. The imaging unit 112 performs photoelectric conversion and outputs an image (analog signal) corresponding to the optical image. In the present embodiment, in the imaging apparatus 110 configured as described above, a rewriting process is performed by setting a direction of the virtual light source capable of adding an appropriate shadow to a subject.

Figure 3:
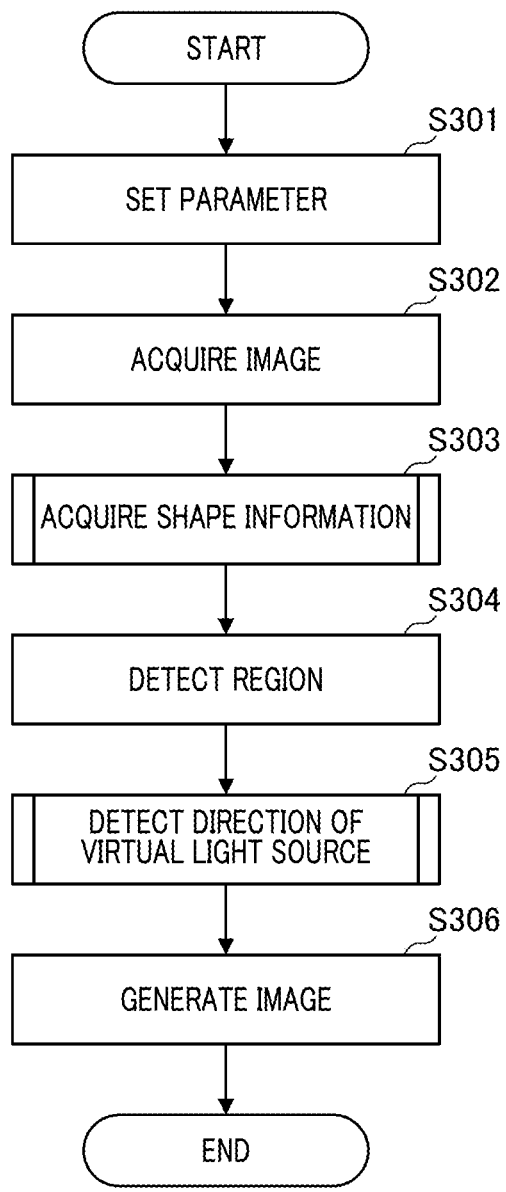
FIG. 3 is a flowchart showing a rewriting process.

FIG. 3 is a flowchart showing the rewriting process. In step S301, the parameter setting unit 103 acquires parameters related to the rewriting process. The parameter setting unit 103 acquires at least the following information (a) to (d) as the parameters.

(a) A distance from the imaging apparatus to a focus position of the subject
(b) A conversion coefficient determined by a size of an opening angle of the center of gravity of the light fluxes passing through the pair of distance measurement pupils
(c) A distance from an image side principal point of the lens of the imaging apparatus to the sensor surface
(d) A focal length of the imaging apparatus The parameter setting unit 103 may acquire these parameters from the memory 102 or from each module of the imaging apparatus 110.

In step S302, the image acquisition unit 104 acquires an image. The image acquisition unit 104 may acquire an image captured by the imaging apparatus 110 from the imaging unit 112, or may acquire a stored image captured in advance from the memory 102. In step S303, the shape information acquisition unit 105 acquires shape information. Here, the shape information is information regarding a shape of the subject. Specifically, the shape information in the present embodiment is information including position information of the shape indicating a position of the shape of the subject as a point group, normal information indicating an inclination of a surface of a local region in the point group, and reliability information of the position information and the normal information. The position information of the shape may be acquired from distance information from the imaging apparatus 110 to the subject. The inclination of the surface of the local region is information such as an amount of displacement or the surface normal in the shape of the local region.

Figure 4:
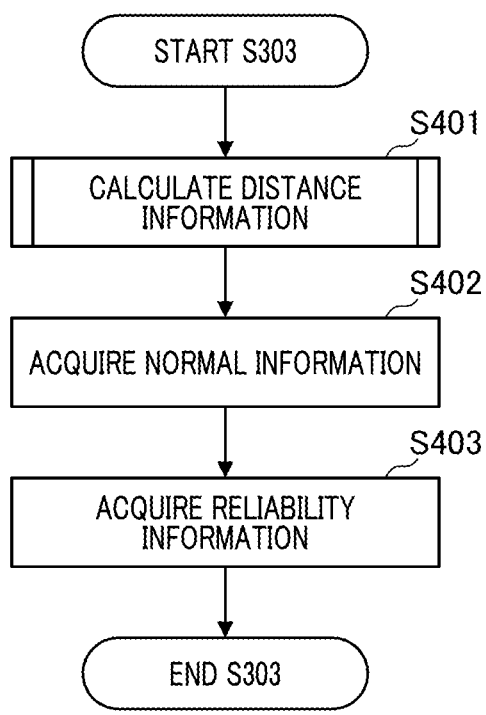
FIG. 4 is a flowchart showing a shape information acquisition method.

Details of the shape information acquisition process will be described with reference to FIG. 4. FIG. 4 is a flowchart showing the shape information acquisition process shown in step S303. In the shape information acquisition process, each of distance information, normal information, and reliability information is acquired.

Distance Information Acquisition Process

First, in step S401, the shape information acquisition unit 105 calculates distance information from the imaging apparatus 110 to the subject. For example, the shape information acquisition unit 105 calculates an image deviation amount from the parallax between a plurality of viewpoint signals through correlation calculation or the like and converts the image deviation amount into a defocus amount. The distance information can be calculated on the basis of the defocus amount. Details of the distance information calculation process will be described with reference to FIG. 5.

Figure 5:
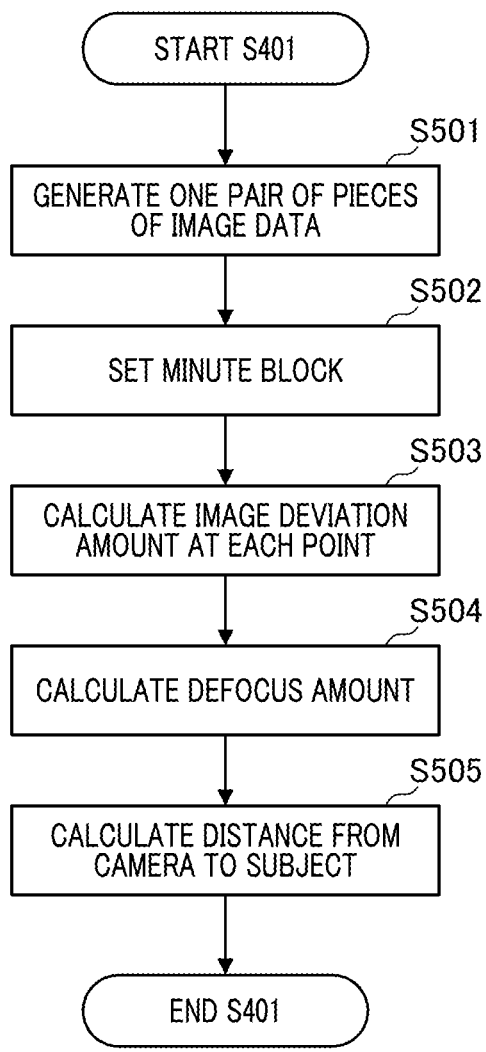
FIG. 5 is a flowchart showing a distance information calculation method.

FIG. 5 is a flowchart showing the distance information acquisition process. In step S501, the shape information acquisition unit 105 generates a plurality of images (a viewpoint image and a pupil divided image) from the image acquired in step S302. In the present embodiment, a pair of images are generated as a plurality of images. The pair of images are, for example, the A image output from the photoelectric conversion portion 116A and the B image output from the photoelectric conversion portion 116B. The pair of images are preferably images having as few shadows as possible. This is because the contrast of shadows is low, and the parallax calculation accuracy in stereo matching is reduced. An image with few shadows can be acquired by capturing an image under lighting conditions such as full emission or no emission. If the imaging apparatus 110 has a light emitting unit, a pattern such as a grid pattern is disposed in a projection system of the light emitting unit, and an image in which the pattern is projected onto a subject is captured to give a pattern to the subject without texture. Thus, it is possible to increase the parallax calculation accuracy.

In step S502, the shape information acquisition unit 105 sets a minute block for each pair of pieces of image data. In the present embodiment, minute blocks having the same size are set for the A image and the B image generated in step S501. The minute blocks are generally synonymous with windows that are set when template matching is performed. Setting of the minute block will be described with reference to FIGS. 6A and 6B.

FIGS. 6A and 6B are diagrams for describing a minute block. FIG. 6A is a diagram for describing a minute block set in step S502. In order to calculate a defocus amount of a pixel of interest 604, a minute block 603 centered on the pixel of interest 604 is set in an A image 601 and a minute block 605 having the same size as that of the minute block 603 is set in a B image 602. As described above, in the present embodiment, a pixel of interest that is the center of a minute block is set for each pixel, and the minute block centered on the pixel of interest is set. FIG. 6B is a diagram for describing a shape of a minute block. The minute block 603 has the size of 9 pixels centered on the pixel of interest 604, whereas a minute block 606 has the size of 25 pixels centered on the pixel of interest 604. As described above, a size of a minute block to be set can be changed.

In step S503, the shape information acquisition unit 105 calculates an image deviation amount. The shape information acquisition unit 105 performs a correlation calculation process in the minute block set in step S502, and calculates an image deviation amount at each point. In the correlation calculation, a pair of pixel data in the minute block are generalized and expressed as E and F, respectively. For example, a data sequence F corresponding to the B image is deviated relative to a data sequence E corresponding to the A image, and a correlation amount C(k) at a deviation amount k between the two data sequences is calculated according to the following Equation (1).

$$C(k)=\Sigma|E(n)-F(n+k)| \quad (1)$$

In Equation (1), C(k) is calculated for the number n of the data sequence. The deviation amount k is an integer, and is a relative deviation amount in units of data intervals of image data. The deviation amount k is synonymous with a parallax amount in a stereo matching method.

Figure 7:
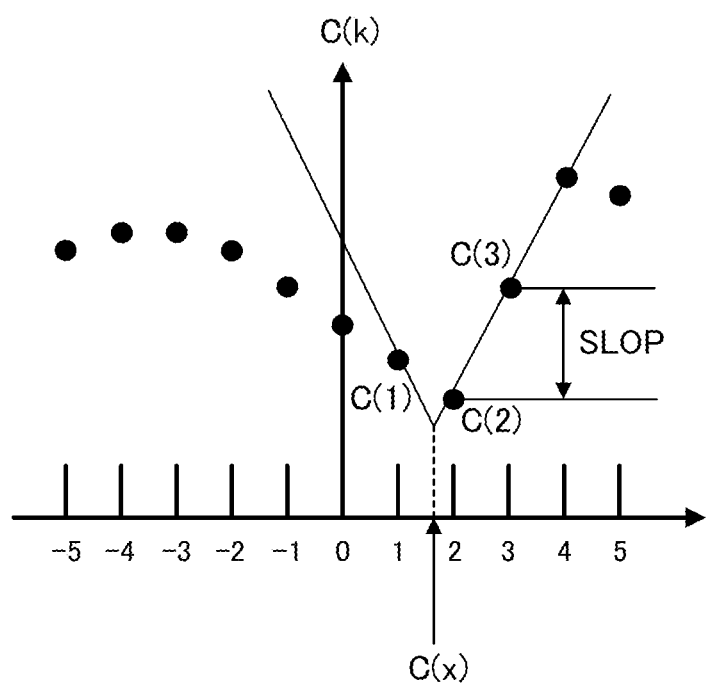
FIG. 7 is a diagram for describing a relationship between an image deviation amount and a correlation value.

An example of a calculation result of Equation (1) will be described with reference to FIG. 7. FIG. 7 is a diagram for describing a relationship between an image deviation amount and a correlation value. In FIG. 7, the horizontal axis represents an image deviation amount and the vertical axis represents a correlation amount. The correlation amount C(k) represents a discrete correlation amount at the deviation amount k, and the correlation amount C(x) represents a continuous correlation amount due to the image deviation amount x. In FIG. 7, the correlation amount C(k) is minimized at an image deviation amount in which the correlation between the pair of data sequences is high.

The image deviation amount x at which the continuous correlation amount C(x) is minimized is calculated, for example, by using a three-point interpolation method according to the following Equations (2) to (5).

$$X=kj+D/\text{SLOP} \quad (2)$$

$$C(x)=C(kj)-|D| \quad (3)$$

$$D=\{C(kj-1)-C(kj+1)\}/2 \quad (4)$$

$$\text{SLOP}=\text{MAX}\{C(kj+1)-C(kj), C(kj-1)-C(kj)\} \quad (5)$$

Here, kj is k at which the discrete correlation amount C(k) is minimized. The deviation amount x obtained by using Equation (2) is set as an image deviation amount in the pair of pieces of image data. The unit of the image deviation amount x is pixel.

In step S504, the shape information acquisition unit 105 converts the image deviation amount into a defocus amount. A magnitude of the defocus amount represents a distance from the image plane 120 of the subject image to the sensor surface 121. Specifically, the shape information acquisition unit 105 may obtain a defocus amount DEF by the following Equation (6) on the basis of the image deviation amount x obtained by using Equation (2).

$$DEF=KX \cdot x \quad (6)$$

In Equation (6), KX is a conversion coefficient determined by a size of an opening angle of the center of gravity of light fluxes passing through the pair of distance measurement pupils. As described above, a defocus amount at each pixel position can be calculated by repeating the processes in steps S502 to S504 while deviating a pixel position of interest by one pixel.

In step S505, the shape information acquisition unit 105 calculates a distance z from the sensor surface 121 of the imaging apparatus 110 to the subject on the basis of the defocus amount calculated in step S504. The distance z may be calculated by using the following Equations (7) and (8).

$$\text{dist}=1/(1/(\text{dist}\_d+DEF)-1/f) \quad (7)$$

$$z=\text{length}-\text{dist} \quad (8)$$

dist is a distance from the focus position to the subject, dist_d is a distance from the image side principal point of the lens of the imaging unit 112 of the imaging apparatus 110 to the sensor surface 121, f is a focal length, and length is a distance from the sensor surface 121 of the imaging apparatus 110 to the focus position. The focus position corresponds to an in-focus position. In the present embodiment, the example in which the shape information acquisition unit 105 calculates the distance z at each point on the basis of the image deviation amount x by using Equations (6) to (8) has been described, but the present invention is not limited to this. The distance z at each point may be calculated according to other calculation methods.

The distance length from the sensor surface 121 of the imaging apparatus 110 to the focus position can be measured by, for example, a laser distance measurement unit (not shown). A relationship between a lens position and a focus position at the time of imaging is provided as a data table, and thus it is possible to estimate a distance to the focus position corresponding to the lens position at the time of imaging. By using the data table indicating the relationship between the lens position and the focus position, it is possible to reduce the time and effort required to measure a distance from the sensor surface 121 of the imaging apparatus 110 to the focus position.

As described above, the distance z from the sensor surface 121 of the imaging apparatus 110 to a subject can be calculated from a defocus amount or an image deviation amount obtained from a plurality of images. In the above-described way, since information can be calculated according to a method of generating a pair of pieces of image data from one image, the imaging apparatus does not need to be a binocular camera and may be a monocular camera, and thus a configuration of the imaging apparatus can be simplified. The calibration process when installing a plurality of cameras can be simplified or eliminated. Although an example in which the image processing device 100 calculates the distance z from image information captured by the imaging apparatus 110 in step S501 has been described, the present invention is not limited to this. For example, the distance z may also be calculated by a stereo camera. The distance z may also be calculated by an external device of the imaging apparatus 110, and the distance z calculated by the external device may be acquired by the image processing device 100. Instead of calculating distance information to a subject on the basis of an image, the distance information may be acquired by a device such as LiDAR. The distance information between the imaging apparatus 110 and the subject calculated in S401 has been described by taking a distance from the sensor surface 121 as an example, but the present invention is not limited to this, and the distance information may be a distance from any position such as the tip of the lens of the imaging apparatus 110.

Normal Information Acquisition Process

FIG. 4 will be referred to again. In step S402, the shape information acquisition unit 105 acquires normal information. Normal information is an inclination of a surface of a local region. The inclination of the surface of the local region may be acquired according to a method of differentiating acquired distance information in an in-plane direction to calculate a displacement amount or a method of calculating the surface normal according to an illuminance difference stereo method. In the present embodiment, as an example, the surface normal is used as the inclination of the surface of the local region, that is, as normal information.

Reliability Information Acquisition Process

In step S403, the shape information acquisition unit 105 acquires reliability information. The reliability may be calculated by determining an evaluation value of the reliability. The reliability may be obtained for each of the distance information and the normal information.

The reliability of the distance information will be described. The reliability of the distance information is information for determining whether or not the acquired distance information can be used. If the reliability is low, the accuracy of the calculated distance information is also low. By calculating and quantifying the reliability as an evaluation value and comparing the evaluation value with a threshold value, it is possible to evaluate whether the reliability is high or low. The evaluation value of the reliability may be calculated from, for example, the luminance of an image, the contrast of an image, a defocus amount at the time of acquiring the distance information, and the like. The reliability obtained by using the evaluation value calculated from the luminance of the image, the contrast of the image, the defocus amount at the time of acquiring the distance information, and the like is adaptable to a method of generating a pair of pieces of image data from one image and calculating a defocus amount to acquire distance information. On the other hand, if the distance information is acquired by a device such as LiDAR and an amplitude of a reflected and returned laser signal is lower than a defined value, a method such as reducing an evaluation value of the reliability of the distance information may be considered. As described above, it is possible to change evaluation items for calculating an evaluation value of the reliability of the distance information depending on a method of acquiring the distance information.

First, an evaluation value of the luminance of an image will be described. In the present embodiment, if the distance information is acquired, an image deviation amount is calculated from a pair of images, but the calculation accuracy of the image deviation amount is reduced in a region where an image signal indicates that the region is too bright or too dark. Assuming that a median value of the luminance when expressing the luminance of an image is Lm and the luminance of a pixel to be evaluated is Lp, an evaluation value L of the luminance can be obtained by using the following Equation (9).

$$L = -|Lm - Lp| \tag{9}$$

By setting the evaluation value L as in Equation (9), it is possible to reduce the evaluation value L of the luminance as the luminance of a pixel deviates from the median value of the luminance when expressing the luminance. The influence of the luminance of an image on the reliability of the distance information can be taken into consideration according to the evaluation value L of the luminance.

Next, an evaluation value of the contrast of an image will be described. In the present embodiment, if the distance information is acquired, an image deviation amount is calculated from a pair of images, but in a region where the contrast of an image signal is low, the accuracy of obtaining the minimum value from the correlation amount C(k) is reduced. An evaluation value of the contrast of the image can be calculated by calculating a variance of the luminance from the luminance of each pixel and its surroundings and setting the variance as an evaluation value B of the contrast. The influence of the contrast of an image on the reliability of the distance information can be taken into consideration according to the evaluation value B of the contrast.

Finally, an evaluation value of the defocus amount will be described. The distance information may be calculated from a defocus amount, but blurring of an image increases as an absolute value of the defocus amount increases, and thus the distance measurement accuracy decreases. That is, as an absolute value of the defocus amount increases, an evaluation value of the reliability decreases. Assuming that an evaluation value of the defocus amount is D for the defocus amount DEF calculated by using Equation (6), the evaluation value D of the defocus amount can be obtained by using Equation (10).

$$D = |DEF| \tag{10}$$

The influence of the defocus amount at the time of acquiring the distance information on the reliability of the distance information can be taken into consideration according to the evaluation value D of the defocus amount.

Assuming that an evaluation value of the reliability of the distance information is M, the evaluation value M of the reliability can be obtained by using the following Equation (11) on the basis of the evaluation value of the luminance of the image, the evaluation value of the contrast of the image, and the evaluation value of the defocus amount at the time of acquiring the distance information.

$$M = L + B + D \quad (11)$$

The shape information acquisition unit 105 obtains the evaluation value M of the reliability of the distance information for each pixel. The shape information acquisition unit 105 determines whether the reliability of the distance information for each pixel is high or low by comparing the evaluation value M of each pixel with any threshold value. If the evaluation value M of the reliability of the distance information is less than the threshold value, the shape information acquisition unit 105 determines that the reliability of the distance information is low, and if the evaluation value M of the reliability of the distance information is equal to or more than the threshold value, determines that the reliability of the distance information is high.

Next, the reliability of normal information will be described. The reliability of the normal information is information for determining whether the acquired normal information can be used. As a method of calculating the reliability of the normal information, for example, there is a method of using an image captured when calculating the normal information according to an illuminance difference stereo method. The illuminance difference stereo method is a method in which a plurality of images of a scene in which a subject is irradiated with light are captured while changing a light source direction, and the surface normal of a subject surface is calculated from a ratio of the brightness of the subject imaged in each light source direction. When imaging is performed a plurality of times while changing a light source direction, it is necessary that a positional relationship between a subject and a camera is fixed and a light source direction at the time of light emission is known. Thus, if the subject or the camera moves when imaging is performed a plurality of times, or if strong light comes in from the outside, this event is detected and processed such that the event is not used for normal calculation. In this case, a ratio of the number of captured images to the number of images actually used for calculation is calculated, and if the number of images used is small, the reliability is made to be low. Assuming that the number of captured images is Gn, the number of images actually used for calculating normal information is Rn, and an evaluation value regarding the number of used images is Cn, the evaluation value Cn of reliability can be obtained by using Equation (12).

$$Cn = Rn/Gn \quad (12)$$

If the number of images in which the luminance of the pixel of interest is saturated is equal to or more than a threshold value, the reliability of the pixel of interest is reduced. Assuming that the number of images in which the luminance of the pixel of interest is saturated is Ln and an evaluation value regarding the number of saturated images is H, the evaluation value H of the reliability can be obtained from Equation (13).

$$H = Ln/Gn \quad (13)$$

Assuming that an evaluation value of the reliability of the normal information is N, the evaluation value N of the reliability can be obtained from Equation (14).

$$N = Cn \times H \quad (14)$$

The shape information acquisition unit 105 obtains the evaluation value N of the reliability of the normal information of each pixel. The shape information acquisition unit 105 obtains the reliability of the normal information at each pixel by setting any threshold value and comparing the threshold value with the evaluation value N of the reliability of the normal information. The shape information acquisition unit 105 determines that the reliability of the normal information is low if the evaluation value N of the reliability of the normal information is less than the threshold value, and determines that the reliability of the normal information is high if the evaluation value N of the reliability of the normal information is equal to or more than the threshold value.

An evaluation value R for evaluating both the reliability of the distance information and the reliability of the normal information can be obtained from Equation (15).

$$R = M \times N \quad (15)$$

The shape information acquisition unit 105 can obtain the reliability at each pixel by setting any threshold value for the evaluation value R and comparing the threshold value with the evaluation value R. The shape information acquisition unit 105 determines that the reliability is low if the evaluation value R is less than the threshold value, and determines that the reliability is high if the evaluation value R is equal to or more than the threshold value.

By restricting a range of image processing in the present embodiment on the basis of the reliability calculated as described above, it is possible to obtain a shaded image with more accurate shape information. It is possible to increase the region detection accuracy by using the respective reliabilities for the distance information and the normal information used in the region detection described in step S304 that will be described later. It is also possible to interpolate the distance information and the normal information by performing a hole-filling interpolation process on the distance information and the normal information having a low reliability with the distance information and the normal information having a high reliability in the surroundings.

Region Detection

FIG. 3 will be referred to again. In step S304, the first region detection unit 106 and the second region detection unit 107 perform region detection. The first region detection unit 106 detects a first region that produces a shadow. The second region detection unit 107 detects two regions that are second regions onto which the shadow is projected.

First, the detection of the first region that produces a shadow will be described. Here, two detection methods will be described for the detection of the first region performed by the first region detection unit 106. The first method of detecting the first region is a method in which a region near the center of the image height within an angle of view of an acquired image is set as the first region. By setting the region near the center of the image height as the first region, a user can set the first region such that a subject placed at the center of the image is a region that produces a shadow. Consequently, it is possible to set the first region without performing particularly complicated processing.

The second method of detecting the first region is a method in which a region near a focus (in-focus position) is set as the first region. By setting the region near the focus position as the first region, it is possible to set the first region such that a subject subjected to being in focus by a user is a region that produces a shadow. Three methods will be described as an example of a method of determining that the region is near the focus position. The first method is a method of referring to the defocus amount DEF calculated by using Equation (6). A threshold value is set for the defocus amount DEF, and a region in which the defocus amount DEF is equal to or less than the threshold value is set as the region near the focus position. The second method is a contrast-based method. Since the region near the focus position generally has less blurring of an image, the contrast is stronger than other regions. Thus, the local contrast in the image is evaluated and compared with a threshold value, and a region in which the contrast is more than the threshold value is set as the region near the focus position. The third method is a method of using position information of an AF frame at the time of imaging. A region of the AF frame at the time of imaging is set as the region near the focus position. In the second method or the third method, the region near the focus position can be detected without calculating the defocus amount DEF.

As the method of detecting the first region, the above two methods may be performed independently, or detection may be performed by combining the two methods. For example, by combining the first method of detecting the first region and the second method of detecting the first region, a region near the center of the image height and a region having high contrast can be detected as the first region. Therefore, the detection accuracy of the first region can be increased. A subject region may be detected as the first region by using a method other than the three detection methods described.

Next, detection of the second region onto which a shadow is projected will be described. Here, two detection methods will be described for the detection of the second region performed by the second region detection unit 107. The first method of detecting the second region is a method of detecting the second region from acquired normal information. Generally, a region onto which a shadow is desired to be projected is a floor surface or a ground. Therefore, a floor surface is detected by using the surface normal calculated from the normal information and set as the second region. Specifically, the second region detection unit 107 takes a histogram of a direction of the surface normal to the entire angle of view of the image on the basis of the normal information acquired in step S303, and sets a region of the surface normal in which a frequency of the histogram is highest as the second region. Consequently, the floor surface can be detected by using the surface normal, especially in a scene where the floor surface occupies a large part in the angle of view, and thus the floor surface can be detected as the second region.

The second method of detecting the second region is a method of detecting the second region from acquired distance information. Generally, a region onto which a shadow is desired to be projected is a floor surface or a ground. Shape information calculated from the distance information changes continuously in a certain direction on the floor surface. Thus, the second region detection unit 107 detects, as the second region, a region in which the shape information calculated from the distance information acquired in step S303 continuously changes in a certain direction within a certain range. As described above, the two detection methods have been described for a method of detecting the second region. As the method of detecting the second region, the above two methods may be performed independently, or detection may be performed by combining the two methods.

A floor surface may be detected as the second region by using a method other than the two detection methods described.

By detecting the first region and the second region as respective exclusive regions, it is possible to increase the detection accuracy of the first region and the second region. For example, a candidate of the first region can be a region other than the second region. Consequently, if the second region is detected, other regions become candidate regions of the first region, and candidates of the first region are restricted, and thus computation cost for calculating the first region can be reduced.

It is possible to detect the first region and the second region by performing image recognition for both of the regions. If, for example, a floor surface is detected as a result of image recognition, that region is set as the second region. A region of a subject recognized in a region other than the floor surface is set as the first region. Since the region can be detected on the basis of the recognized subject through the image recognition, it is possible to detect a region with higher accuracy than detection from a region near the center of the image height or a region near the focus. The region detection using image recognition may be performed in combination with the region detection using the first region detection method and the second region detection method described above. For example, by calculating a histogram of the surface normal of a region recognized as a floor and redetecting a region of the surface normal with a high frequency of the histogram as the floor, the floor that could not be detected due to image recognition failure can be detected.

If the distance information or the normal information acquired in step S303 is used in detection of the first region and the second region of step S304, information to be used may be restricted on the basis of such reliability information. For example, the reliability of the distance information is compared with a threshold value, and the distance information of which the reliability is less than the threshold value is not used for region detection. It is possible to increase the region detection accuracy by using the respective reliabilities for the distance information and the normal information used in the region detection.

Virtual Light Source Direction Determination Process

In step S305, the virtual light source direction setting unit 108 determines a direction of the virtual light source. A virtual light source is a surface light source, and parallel light is applied to the subject from the determined direction of the virtual light source. A position of the virtual light source in the present embodiment is obtained with a declination as a direction in a case where a radius is infinite in a polar coordinate system. Therefore, in the present embodiment, a direction of the virtual light source is determined instead of a position of the virtual light source. By automatically determining a direction of the virtual light source, a main subject within an angle of view produces appropriate shadows on other subjects without a user adjusting an amount of distance between the virtual light source and the subject, an amount of light of the virtual light source, and a light beam direction.

Figure 8:
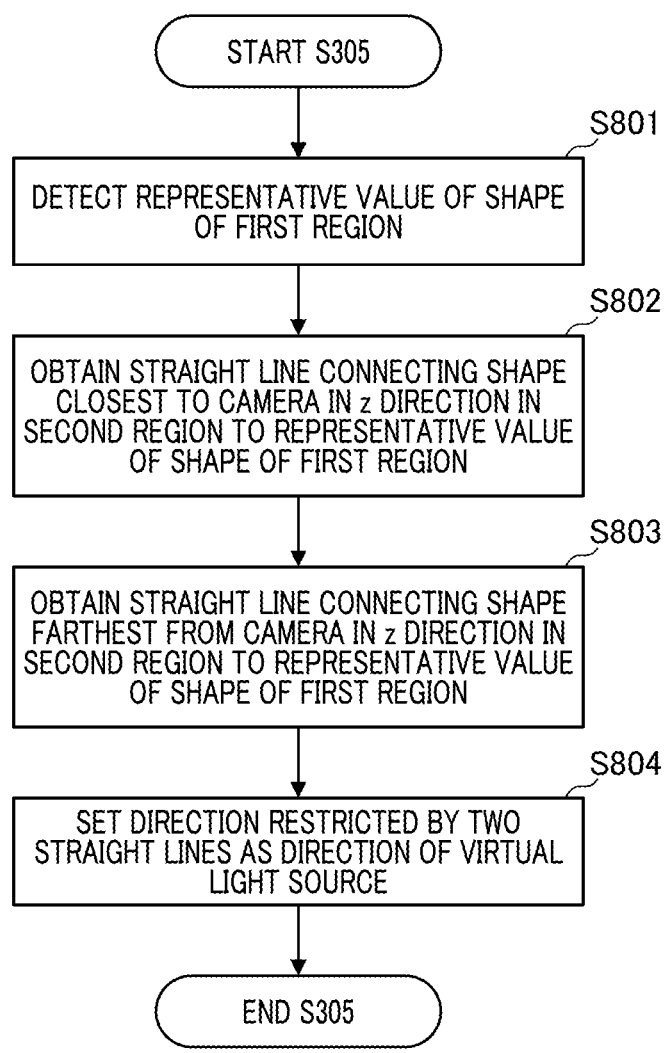
FIG. 8 is a flowchart showing a method of determining a direction of the virtual light source.
Figure 9A:
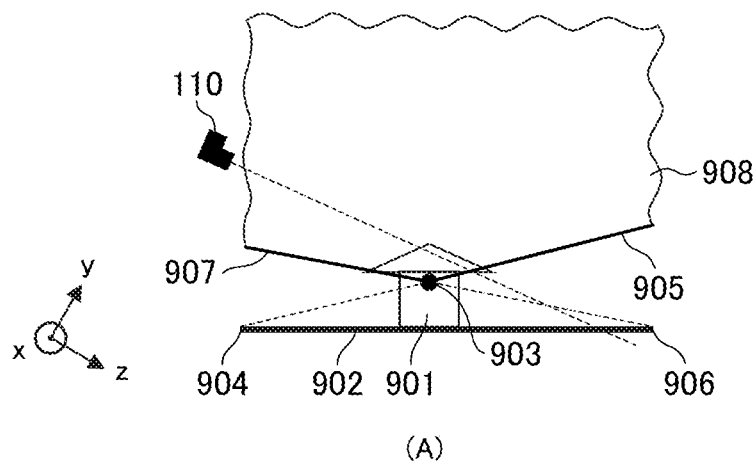
FIGS. 9A and 9B are diagrams for describing a method of determining a direction of the virtual light source.
Figure 9B:
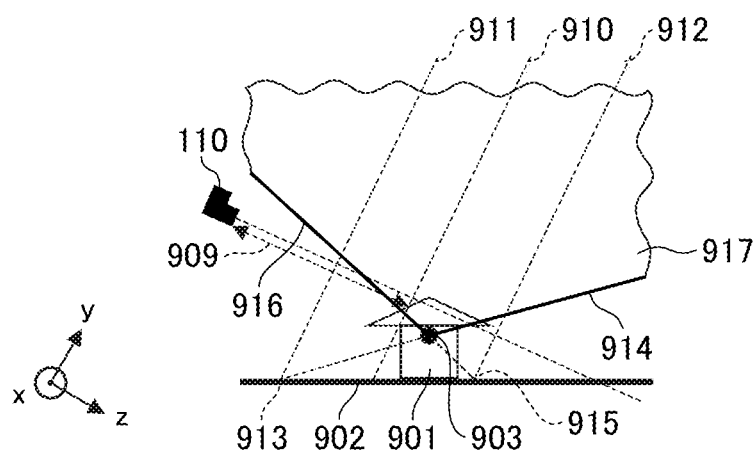

A method of determining a direction of the virtual light source will be described with reference to FIGS. 8 to 10B. FIG. 8 is a flowchart showing an example of the virtual light source direction determination process in step S305. FIGS. 9A and 9B are diagrams for describing a method of determining a direction of the virtual light source. In FIGS. 9A and 9B, the horizontal direction of an image captured by the imaging apparatus 110 is an x direction, the vertical direction is a y direction, and the depth direction is a z direction.

FIG. 9A is a diagram showing a positional relationship between the imaging apparatus 110 and each subject when viewed from the x direction. A value in the x direction takes a larger value from the left end to the right end of an image in the horizontal direction of the image. A value in the y direction takes a larger value from the upper end to the lower end of the image in the vertical direction of the image. A value in the z direction takes a larger value from a depth value on the front side to a depth value on the depth side. A region 901 is a region detected as the first region, and a region 902 is a region detected as the second region.

In step S801, the virtual light source direction setting unit 108 calculates a representative value of the first region detected in step S304. The virtual light source direction setting unit 108 calculates a representative value of the first region by calculating, for example, an average value of x, y, z coordinate values of the first region. If a focus position is included in the first region, the virtual light source direction setting unit 108 may use x, y, z coordinate values of the focus position as representative values of the first region. The virtual light source direction setting unit 108 may use a center of gravity point of the first region as a representative value of the first region.

In step S802, the virtual light source direction setting unit 108 calculates a straight line connecting a point having the smallest value in the z direction in the second region to the representative value of the first region calculated in step S801. For example, in FIG. 9A, a straight line 905 may be obtained by connecting a representative value 903 of the first region to a point 904 closest to the camera in the second region, which is a point having the smallest value in the z direction in the second region.

In step S803, the virtual light source direction setting unit 108 obtains a straight line connecting a point having the largest value in the z direction in the second region to the representative value of the first region. In FIG. 9A, a straight line 907 may be obtained by connecting the representative value 903 of the first region to a point 906 farthest from the camera in the second region, which is a point having the largest value in the z direction in the second region.

In step S804, the virtual light source direction setting unit 108 determines a direction restricted by the straight line 905 calculated in step S802 and the straight line 907 calculated in step S803 as a direction of the virtual light source. In FIG. 9A, a direction 908 is a direction of the virtual light source restricted by the straight lines 905 and 907.

Through step S801 to step S804, the direction of the virtual light source in the quadratic yz space defined by the y direction and the z direction when viewed from the x direction is restricted. Similarly, it is possible to restrict the direction of the virtual light source in the xz space when viewed from the y direction. The virtual light source direction setting unit 108 sets the virtual light source within a range of the restricted direction of the virtual light source, and thus sets the direction of the virtual light source in which the first region is guaranteed to add a shadow to the second region. As described above, by automatically setting the direction of the virtual light source within the range of the restricted direction of the virtual light source, it is possible to easily obtain an image in which the first region projects a shadow onto the second region.

Next, an example of determining a direction of the virtual light source by using a defocus amount (effective distance measurement range) will be described. In a process of determining a direction of the virtual light source, it is also possible to determine a direction of the virtual light source by using an effective distance measurement range corresponding to the defocus amount calculated in step S504. FIG. 9B is a diagram for describing a method of determining a direction of the virtual light source by using the effective distance measurement range. FIG. 9B shows a positional relationship between the imaging apparatus 110 and each subject when viewed from the x direction, as in FIG. 9A. A straight line 909 indicates a distance from the imaging apparatus 110 to the focus position. A focus plane in the xy direction is obtained from the focus position, and a focus plane when the focus plane in the xy direction is viewed from the x direction is a straight line 910.

As an absolute value of the defocus amount calculated in step S504 increases, blurring of the image increases and the distance measurement accuracy decreases. Therefore, by setting a threshold value for the defocus amount, a direction of the virtual light source is restricted such that a shadow is not projected onto the second region having the defocus amount equal to or more than the threshold value. A straight line 911 and a straight line 912 are straight lines when a surface having a defocus amount separated by a threshold value from the straight line 910 is viewed from the x direction. The virtual light source direction setting unit 108 obtains each straight line connecting each point at which each straight line intersects the second region to the representative value 903 of the shape of the first region.

Specifically, a point 913 at which the straight line 911 close to the imaging apparatus 110 intersects the second region is the point 913 closest to the imaging apparatus 110 in the effective distance measurement range in the second region. The virtual light source direction setting unit 108 obtains a straight line 914 by connecting the representative value 903 of the shape of the first region to the point 913 of the second region. A point 915 at which the straight line 912 far from the imaging apparatus 110 intersects the second region is the point 915 farthest from the imaging apparatus 110 in the effective distance measurement range in the second region. The virtual light source direction setting unit 108 obtains a straight line 916 by connecting the representative value 903 of the shape of the first region to the point 915 of the second region. By performing the same process as in step S804 on the basis of the straight line 914 and the straight line 916, the virtual light source direction setting unit 108 can set a direction of the virtual light source 917 restricted by the straight line 914 and the straight line 916. The virtual light source direction setting unit 108 sets a virtual light source within a range of the restricted direction of the virtual light source, and thus sets the direction of the virtual light source in which the first region is guaranteed to add a shadow to the second region. As described above, by restricting a range of the direction of the virtual light source on the basis of the defocus amount (effective distance measurement range), it is possible to increase the accuracy of the rewriting process.

In the virtual light source direction setting unit 108, in the process of determining a direction of the virtual light source, a range of the direction of the virtual light source may be restricted such that a shadow is not added to the second region having low reliability on the basis of the reliability information acquired in step S403. By excluding the second region having a reliability less than a threshold value from a region to which a shadow is added, it is possible to obtain a shaded image with higher accuracy. The reliability information used in the process of determining a direction of the virtual light source may be an evaluation value M of the reliability of the distance information or an evaluation value N of the reliability of the normal information, or may be an evaluation value R for evaluating both the reliability of the distance information and the reliability of the normal information.

Next, a process of determining a direction of the virtual light source in a case where a user designates an approximate direction of the virtual light source will be described. In the present embodiment, it is possible to determine a direction of the virtual light source on the basis of the approximate direction of the virtual light source designated by the user. The approximate direction of the virtual light source that can be designated by the user shows, for example, whether light from a virtual light source is "forward light/backlight/top light" with respect to a subject, or is a direction of the virtual light source as viewed from the imaging apparatus 110 is "right/center/left" of a subject.

Figure 10A:
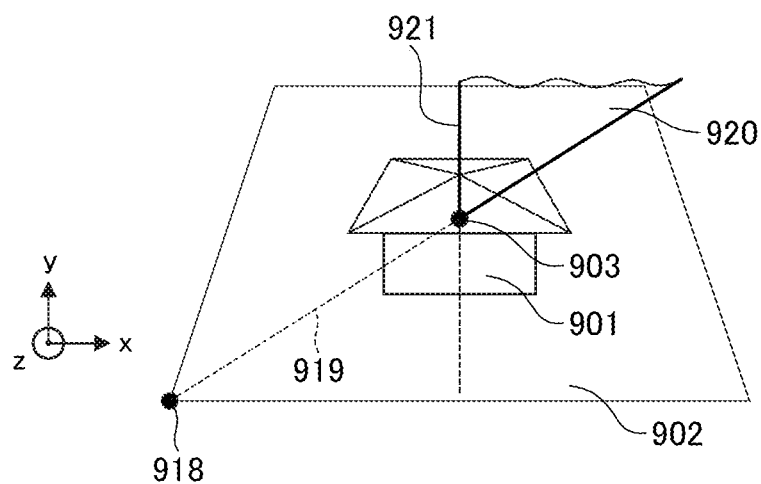
FIGS. 10A and 10B are diagrams for describing a method of determining a direction of the virtual light source based on an approximate direction of the virtual light source designated by a user.
Figure 10B:
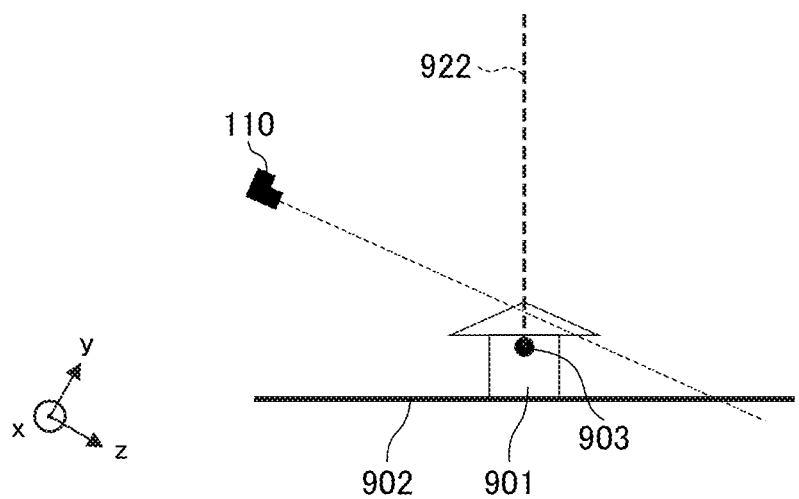

A method of determining a direction of the virtual light source based on the approximate direction of the virtual light source designated by the user will be described with reference to FIGS. 10A and 10B. FIGS. 10A and 10B are diagrams for describing a method of determining a direction of the virtual light source based on the approximate direction of the virtual light source designated by the user. In FIGS. 10A and 10B, similarly to FIGS. 9A and 9B, the horizontal direction of an image captured by the imaging apparatus 110 is the x direction, the vertical direction is the y direction, and the depth direction is the z direction.

FIG. 10A is a diagram for describing a direction of the virtual light source in a case where the user designates "backlight, right" as the approximate direction of the virtual light source in the positional relationship of each subject when viewed from the z direction. In order for light from the virtual light source to be subject "backlight", it is necessary to set a direction of the virtual light source behind the region 901 that is the subject with respect to the imaging apparatus 110. In order for a direction of the virtual light source to be "right", it is necessary to set the direction of the virtual light source on the right side of the first region 901 that is the subject. In the present embodiment, with a straight line 921 connecting the representative value 903 of the shape of the first region 901 to the imaging apparatus 110 as a boundary, "right" that is the direction of the virtual light source designated by the user is set to a region on the right side of the straight line 921, and "left" that is direction of the virtual light source designated by the user is set to a region on the left side of the straight line 921. Therefore, in a case where the user designates "backlight, right" as the approximate direction of the virtual light source, a virtual light source is set to the back side and the right side of the region 901.

In a case where there is a virtual light source in an approximate direction such as "backlight, right" designated by the user, a shadow of the subject due to the virtual light source is added to the front left side of the subject. Thus, the virtual light source direction setting unit 108 selects a point 918 on the front left side in the second region 902 within the angle of view for "backlight, right" designated by the user as the approximate direction of the virtual light source. The virtual light source direction setting unit 108 obtains a straight line 919 connecting the selected point 918 to the representative value 903 of the first region. The virtual light source direction setting unit 108 determines a direction of the virtual light source 920 restricted by the straight line 919 and the straight line 921. As described above, by restricting a direction of the virtual light source with the straight line 919, it is possible to determine a direction of the virtual light source in which the first region can project a shadow onto the second region in the approximate direction of the virtual light source designated by the user.

An approximate direction of the virtual light source designated by the user may be set to "forward light, center" as well as "backlight, right", and a direction of the virtual light source may be determined in the same manner as in the case of "backlight, right". As described above, by determining a direction of the virtual light source on the basis of an approximate direction of the virtual light source designated by the user, it is possible to generate a shaded image from the direction desired by the user.

A case where the approximate direction of the virtual light source designated by the user is top light will be described with reference to FIG. 10B. FIG. 10B is a diagram for describing a positional relationship between the imaging apparatus 110 and each subject when viewed from the x direction. In a case where the approximate direction of the virtual light source is top light, the virtual light source direction setting unit 108 determines, as the direction of the virtual light source, a position on a straight line 922 perpendicular to the second region 902 from the representative value 903 of the region 901 detected as the first region. A direction of top light in the first region 901 that is the subject is a direction perpendicular to a surface of the floor or the like (second region 902) on which the subject is placed, and a direction of the second region 902 can be calculated from the normal information acquired in step S303. As described above, it is possible to determine a direction of the virtual light source even in a case where the approximate direction of the virtual light source designated by the user is top light. Consequently, it is possible to generate a shaded image from the direction of top light desired by the user. In the present embodiment, an example in which a user gives an instruction for an approximate direction of the virtual light source has been described, but the present invention is not limited to this, and the user may designate, for example, a direction of a shadow added through a rewriting process.

FIG. 3 will be referred to again. In step S306, the image generation unit 109 performs image processing (rewriting process) of adding a shadow of the subject to the image on the basis of the direction of the virtual light source determined in step S305 and the shape information acquired in step S303, and generates a shaded image. A method of generating a shaded image will be described with reference to FIG. 11.

Figure 11:
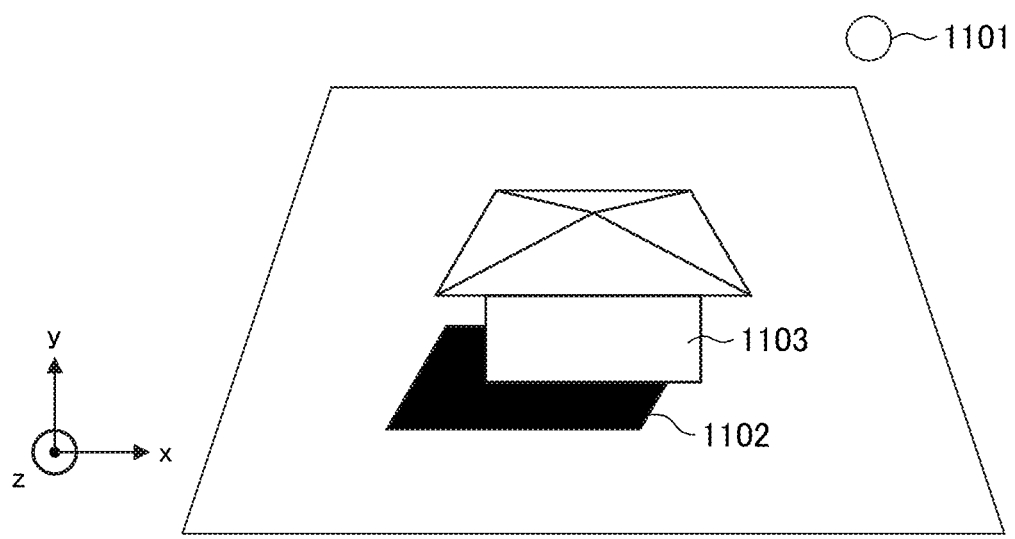
FIG. 11 is a diagram for describing a method of generating an image with a single light source.

FIG. 11 is a diagram for describing a method of adding a shadow of a subject to an image on the basis of a determined direction of the virtual light source. A virtual light source 1101 indicates a direction of the virtual light source uniquely set from the direction of the virtual light source restricted in step S305. The image generation unit 109 generates a shadow 1102 from the shape information of the subject 1103 that is the first region, and the direction of virtual light source 1101, and adds the shadow 1102 to the second region on the image. As a method of generating a shadow on the basis of the shape information and the direction of the virtual light source, for example, there is a ray tracing method or a shadow map method, and by using these methods, it is possible to generate a shaded image. By adding a shadow as described above, it is possible to generate a shaded image in which the first region projects a shadow onto the second region. It is also possible to add a shadow to the first region by using the normal information of the first region and a direction of the virtual light source 1101.

Figure 12:
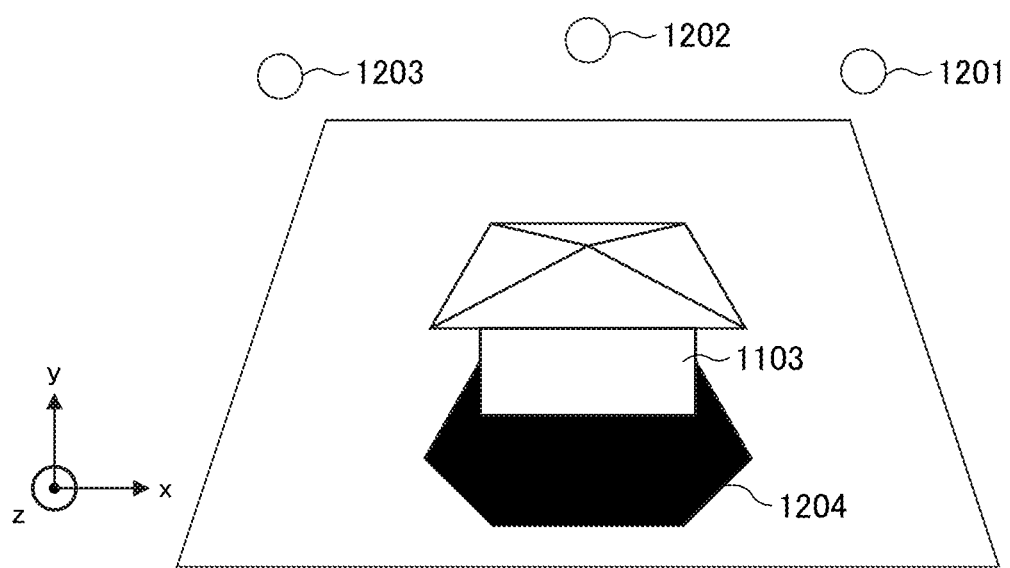
FIG. 12 is a diagram for describing a method of generating an image with a plurality of light sources.

If a shaded image is generated, it is also possible to generate a shaded image with a plurality of virtual light sources by setting directions of a plurality of virtual light sources. A method of generating a shaded image with a plurality of virtual light sources will be described with reference to FIG. 12. FIG. 12 is a diagram for describing a method of adding a shadow of a subject to an image according to directions of a plurality of virtual light sources. Any number of virtual light sources can be set within a range of the direction of the virtual light source restricted in step S305. With reference to FIG. 12, an example in which three virtual light sources (a virtual light source 1201 to a virtual light source 1203) are set will be described.

A shadow 1204 of the subject 1103 generated by each virtual light source may be generated by using the ray tracing method or the shadow map method in the same manner as in the case of a single virtual light source. In the same manner as in the case of a single virtual light source, by using the normal information of the first region and a direction of each virtual light source, a shadow may be added to the subject 1103 that is the first region by each virtual light source. By adding a shadow as described above, it is possible to generate a shaded image even in a case of a plurality of virtual light sources.

As described above, according to the present embodiment, it is possible to set a direction of a virtual light source in which a main subject generates an appropriate shadow on other subjects by restricting the direction of the virtual light source that can add a shadow of the first region to the second region.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-094028, filed Jun. 4, 2021, which is hereby incorporated by reference wherein in its entirety.

What is claimed is:

1. An image processing device comprising:
at least one processor and/or circuit configured to function as:
a shape acquisition unit configured to acquire shape information of a subject;
a first region detection unit configured to detect a first region generating a shadow of the subject;
a second region detection unit configured to detect a second region onto which the shadow is projected;
a direction setting unit configured to set a direction of a virtual light source in which the first region projects the shadow onto the second region on the basis of the shape information, the first region, and the second region; and
an image generation unit configured to generate an image with the shadow on the basis of the shape information and the set direction of the virtual light source.

2. The image processing device according to claim 1, wherein
the shape information includes distance information of the subject or normal information of the subject.

3. The image processing device according to claim 2, wherein
the shape information includes a reliability of the distance information or a reliability of the normal information.

4. The image processing device according to claim 3, wherein
the shape acquisition unit sets the direction of the virtual light source such that a region in which the reliability of the distance information or the reliability of the normal information is low is excluded from the second region onto which the shadow is projected.

5. The image processing device according to claim 1, wherein
the first region detection unit detects the first region from a region near a center of an image height of the image.

6. The image processing device according to claim 1, wherein
the first region detection unit detects the first region from a region near a focus position.

7. The image processing device according to claim 1, wherein
the second region detection unit detects the second region on the basis of the shape information.

8. The image processing device according to claim 7, wherein
the second region detection unit calculates a histogram of a surface normal of the subject from normal information of the subject included in the shape information, and detects a region having the surface normal in which a frequency of the histogram is highest as the second region.

9. The image processing device according to claim 7, wherein
the second region detection unit detects a region in which the shape information calculated from distance information of the subject continuously changes in a certain direction as the second region.

10. The image processing device according to claim 1, wherein
the first region detection unit and the second region detection unit detect the first region and the second region through image recognition.

11. The image processing device according to claim 1, wherein
the first region and the second region are regions that are mutually exclusive.

12. The image processing device according to claim 1, wherein
the direction setting unit sets the direction of the virtual light source such that the first region projects a shadow onto the second region on the basis of a representative value of the first region and shape information of the second region.

13. The image processing device according to claim 1, wherein
the direction setting unit sets the direction of the virtual light source on the basis of an effective distance measurement range calculated from a defocus amount.

14. The image processing device according to claim 1, wherein
the direction setting unit sets the direction of the virtual light source according to an approximate direction of the virtual light source designated by a user.

15. The image processing device according to claim 1, wherein
the image generation unit generates an image to which the shadow is added on the basis of the shape information and directions of a plurality of virtual light sources.

16. An imaging apparatus comprising:
an imaging sensor that captures a plurality of images by receiving each of light fluxes that pass through different pupil regions of an imaging optical system; and
at least one processor and/or circuit configured to function as:
    a shape acquisition unit configured to acquire shape information of a subject;
    a first region detection unit configured to detect a first region generating a shadow of the subject;
    a second region detection unit configured to detect a second region onto which the shadow is projected;
    a direction setting unit configured to set a direction of a virtual light source in which the first region projects the shadow onto the second region on the basis of the shape information, the first region, and the second region; and
    an image generation unit configured to generate an image with the shadow on the basis of the shape information and the set direction of the virtual light source,
wherein the shape acquisition unit calculates distance information of the subject on the basis of a defocus amount or an image deviation amount obtained from the plurality of images.

17. An image processing method of adding a shadow to an image comprising:
acquiring shape information of a subject;
detecting a first region generating a shadow of the subject;
detecting a second region onto which the shadow is projected;
setting a direction of a virtual light source in which the first region projects the shadow onto the second region on the basis of the shape information, the first region, and the second region; and
generating an image with the shadow on the basis of the shape information and the set direction of the virtual light source.

18. A non-transitory storage medium on which a computer program for causing a computer of an image processing device to execute an image processing method of adding a shadow to an image is stored, the image processing method comprising:
acquiring shape information of a subject;
detecting a first region generating a shadow of the subject;
detecting a second region onto which the shadow is projected;
setting a direction of a virtual light source in which the first region projects the shadow onto the second region on the basis of the shape information, the first region, and the second region; and
generating an image with the shadow on the basis of the shape information and the set direction of the virtual light source.

* * * * *